(12) United States Patent
Ben Ayed

(10) Patent No.: US 8,769,643 B1
(45) Date of Patent: Jul. 1, 2014

(54) METHOD FOR IDENTIFYING A REMOTE DEVICE

(71) Applicant: Mourad Ben Ayed, Cupertino, CA (US)

(72) Inventor: Mourad Ben Ayed, Cupertino, CA (US)

(*) Notice: Subject to any disclaimer, the term of this patent is extended or adjusted under 35 U.S.C. 154(b) by 0 days.

(21) Appl. No.: 14/070,579

(22) Filed: Nov. 4, 2013

(51) Int. Cl.
*G06F 7/04* (2006.01)

(52) U.S. Cl.
USPC .............................................................. 726/5

(58) Field of Classification Search
USPC .......................................... 726/4, 5, 6, 18, 19
See application file for complete search history.

(56) References Cited

U.S. PATENT DOCUMENTS

| | | | |
|---|---|---|---|
| 8,467,770 | B1 | 6/2013 | Ben Ayed |
| 8,478,816 | B2 | 7/2013 | Parks et al. |
| 2009/0221266 | A1 | 9/2009 | Ohta et al. |
| 2012/0278886 | A1* | 11/2012 | Luna ................................ 726/22 |
| 2013/0013875 | A1* | 1/2013 | Brown et al. ................. 711/162 |
| 2013/0157722 | A1* | 6/2013 | Kim et al. ..................... 455/566 |

* cited by examiner

*Primary Examiner* — Jeffrey Pwu
*Assistant Examiner* — Anthony Brown
(74) *Attorney, Agent, or Firm* — Daniel S. Schein

(57) ABSTRACT

A method for identifying a remote client device and sending a transaction to that remote client device. The method enables mobile payment, mobile signing as well as mobile ID.

20 Claims, 4 Drawing Sheets

METHOD FOR IDENTIFYING A REMOTE DEVICE

PRIORITY

The present application is a Continuation-In-Part ("CIP") of pending U.S. patent application Ser. No. 13/954,633, filed Jul. 4, 2013.

FIELD OF THE INVENTION

The present invention relates to systems and methods for identification, and most particularly, identifying a user using an application foreground mode indicating this is the target user and a background mode.

BACKGROUND

Identifying a user remotely and completing a secure transaction with that user has always been a challenge.

Usernames, passwords, one-time passwords and biometrics require contact and cannot perform remote transactions.

Magnetic cards, smart cards, RFID and NFC are costly and require a short distance from a specialized reader.

Thus, a need exists for a method smart token device that enables to remotely identify a party in a transaction and perform a secure transaction with that party.

SUMMARY OF THE INVENTION

A method for identifying a client device from among a number of devices and for sending information to the client device comprising:
running at least one first application onboard at least one client device,
whereby when the at least one first application is in the foreground of the at least one client device,
after receipt of a first short wireless message, a first wireless response is sent,
and whereby when the at least one first application is in the background of the at least one client device,
after receipt of a short wireless message similar to the first short wireless message, a second response is provided,
wherein the second response is different from the first wireless response;
whereby after a second device sends at least one short wireless message,
a second application running onboard the second device obtains responses and identifies at least one remote client device with the at least one first application running in the foreground of the at least one client device,
the second application sends at least one request wirelessly to the at least one remote client device,
wherein the at least one request includes transaction information selected from the group consisting of:
an invoice, a receipt, a reservation, a confirmation, a reward, a charge, transaction details, a coupon, a file, a transaction ID, an encryption key, a decryption key, and information corresponding to the remote client device identifier.

A method for identifying a client device from among a number of devices and sending information to the client device comprising:
running at least one first application onboard at least one client device;
whereby after a second device sends at least one short wireless message,
a second application running onboard the second device obtains responses and identifies at least one client device running the at least one first application,
the second application sends a wireless request for hand signature to the at least one client device;
whereby after a client device receives a request for hand signature from the second device,
the at least one first application running onboard the client device captures at least one hand signature,
the client device sends data corresponding to the captured at least one hand signature wirelessly to the second device.

A method for identifying a client device from among a number of devices and for sending information to the client device comprising:
running a first application onboard a client device,
whereby the first application corresponds to a user account on a remote server,
whereby when launched, the first application obtains a new identifier,
wherein the new identifier can be different from a previously obtained identifier,
wherein the new identifier is stored as part of the user account information on the remote server,
wherein the new identifier enables a remote device to connect to the client device using short wireless communication;
whereby a second application running onboard a second device obtains an identifier corresponding to a user account from the remote server and connects to a remote device corresponding to the identifier using short wireless communication,
wherein the identifier corresponding to the user account can be different from a previously obtained identifier for the user account;
whereby the second application sends at least one request wirelessly to the remote device,
wherein the at least one request includes transaction information selected from the group consisting of:
an invoice, a receipt, a reservation, a confirmation, a reward, a charge, transaction details, a coupon, a file, a transaction ID, an encryption key, a decryption key, and information corresponding to the remote client device identifier.

BRIEF DESCRIPTION OF THE FIGURES

The present inventions may be more clearly understood by referring to the following figures and further details of the inventions that follow.

Similar reference numerals are used in different figures to denote similar components.

FURTHER DETAILS OF THE INVENTIONS

This patent teaches a method for identifying a remote device. Identifying a user remotely and completing a secure transaction with that user has always been a challenge. Usernames, passwords, one-time passwords and biometrics require contact and cannot perform remote transactions. Magnetic cards, smart cards, RFID and NFC are costly and require a short distance from a specialized reader.

The current method involves a user unlocking a smart phone and bringing an authorization application to the foreground by touching it or clicking it or activating it or launching it. When in the foreground, the authorization application responds to a reader differently then when the authorization application is not launched or when it is in the background.

This enables a new way of signaling whereby a receiver identifies himself/herself to a scanner by bringing an authorization application to the foreground, and after that, a secure transaction can take place between the scanning device and the receiver device. After a pre-determined period of time, the application changes state and stops responding to requests. This enables the merchant with a scanner to find new clients without seeing the old clients that may still have their application in the foreground. In the meantime, the users that are not targets have their authentication application running in the background.

Figure 1:
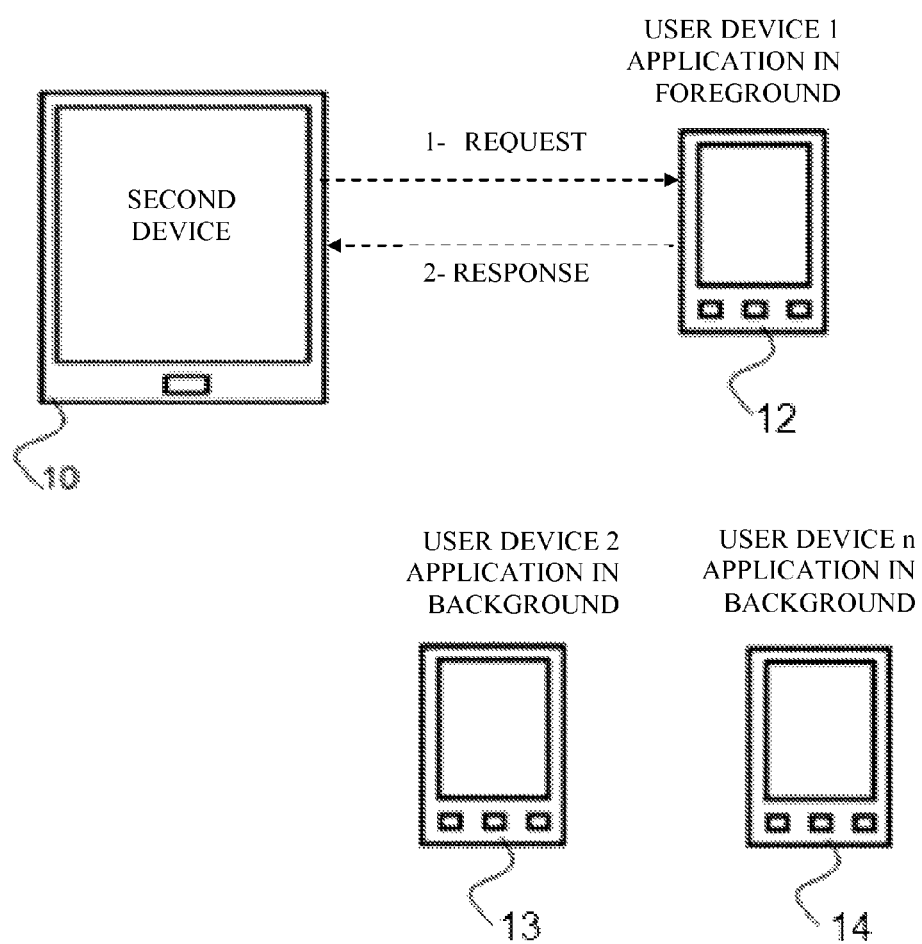
FIG. 1 is a schematic illustrating identifying a remote device

Referring to FIG. 1, a number of uses devices is shown. User device 12 shows a first device with an authorization application in the foreground. User device 13 shows a second device with an authorization application in the background. Similarly, user device 14 shows an n'th device with an authorization application in the background. A second device 10 identifies user device 12 and exchanges data with it. Second device 10 can be any device including a mobile device, a computing device, a television set, a point of sale terminal, an electronic system, a door entry reader. User device 12, 13, 14 communicates with second device 10 using wireless/cellular data communication or short wireless communication or both.

Figure 2:
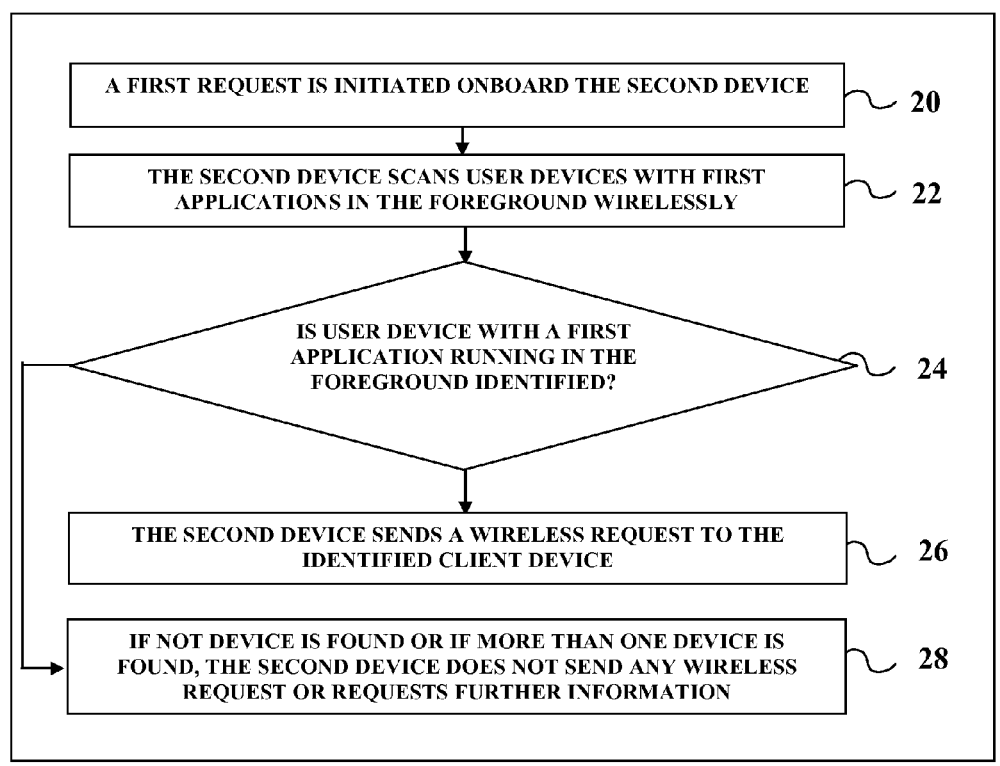
FIG. 2 is a flowchart illustrating a method for identifying a remote device

Referring to FIG. 2, a flowchart illustrates a method for identifying a remote client device from among a number of devices and for sending information to the client device. In step 20, a first transaction is initiated onboard second device 10. For example, a merchant initiates a scan for a client device, a remote user initiates a scan, a program automatically initiates a scan every period of time, or a program initiates a scan after sensing motion or heat or change in conditions.

In step 22, the second device 10 scans user devices wirelessly to identify at least one client device with an authorization application in the foreground.

There are several methods to determine if a known application is in the foreground or not: An application on a smart phone can be seen as having 3 operation states: not running, running in the background, and running in the foreground. When not running, the authorization application will not publish a service or a characteristic indicating it is in the foreground or will not respond to short wireless requests (such as Bluetooth). Typically in client devices such as mobile phones or tablet computers, there is only one foreground application. An application can switch from the foreground to the background and vice versa on a mobile device or table. The application comes to the foreground when the user clicks on its icon, or touches it, or selects it or performs an action (shake, move . . . ) that triggers the application to go to the foreground. Once the user selects another application, the application is no longer in the foreground, and is assumed to go to the background. If the mobile phone or tablet times out and locks, the application is no longer in the foreground, and is assumed to go to the background. The application can continue to run in the background, however, it will not be displayed in the user interface, and the functions available to an application in the background may be limited by the operating system.

When running in the foreground, or when the at the authorization application comes to the foreground or when the authorization application is brought to the foreground, the authorization application publishes or broadcasts a state indicating app-in-foreground. When the application is in the foreground, it publishes a different state or service or characteristics than when it is in the background or it will respond differently to wireless messages than when it is in the foreground. That way, other applications can find the state through short wireless communication. After a predetermined period of time or after receiving a user action or a user authorization, the authorization application can stop broadcasting the state indicating app-in-foreground. Also, after receiving a connection request from a remote device, the authorization application can stop broadcasting the state indicating app-in-foreground.

In another preferred embodiment, after a predetermined period of time from being in the foreground, the authorization application no longer publishes the app-in-foreground state or publishes another state.

When running in the background, the authorization application can be configured to not display the app-in-foreground state or to publish another state.

In another embodiment, the authorization application can keep an internal state of application is in the foreground or background. A second device can connect to the application, and request information about the internal state.

In a preferred embodiment, the authentication application stores at least one first digital key onboard the client device, a password, a random key, a one-time-password generator, a certificate, a Private Key Infrastructure (PKI) key, a symmetric key, an asymmetric key, payment information, access information, and physical access code.

It is noted that the application is enabled with Bluetooth Low Energy, and that it is scannable from a distance longer than 4CM which is the distance of Near Field Communication. Bluetooth Low Energy can be scannable from a distance of 1 m, 5 m, 10 m and upto 20 m.

It is also notes that the application or authentication application is installed by a user and is not factory installed. The authentication application is not part of the operating system. It is installed from an application store. The authentication application is also associated with a user account on a database, can load policies, and can be disabled from the database.

In step 24, if a remote user device with an authentication application running in the foreground is identified, in step 26, the second device 10 sends a wireless request to the identified client device. If not, then in step 28, the second device 10 does not send any wireless request.

The second application can also check the proximity of the client device by measuring RSSI (received signal strength indication) and checking if it is above or below a threshold. The second application can determine the approximate distance of the client device. If the client device is found to be not within a predetermined range (determined by RSSI or other means), then the second device does not send a transaction to the client device.

If second device 10 finds more than one user device with authentication applications running in the background, then it can either not send a wireless request, send a wireless request to both, or prompt the user to select one device among the list of found devices.

The second device can send a request to the client device including: an invoice, a receipt, a reservation, a confirmation, a reward, a charge, transaction details, a coupon, a file, a transaction ID, an encryption key, a decryption key, and information corresponding to the remote client device identifier.

Upon receiving a request from the second device, the authorization application can display the request transaction information onboard the client device, and if the user approves, it can send a response to the second device with user data including: a password, a digital key, payment information, access information, a digital payment certificate, user information, confirmation ID, signature, and a one-time password, The user approval can be a button activation, a menu selection, a touch, a tap, a motion, a one-time password, biometrics, and submitting user credentials.

In a preferred embodiment, the wireless transaction request includes a code indicating a method of user authentication or user approval.

After receiving the user data, the second application can perform an action using the user data including: fill a form, decrypt the user data, encrypt the user data, login, submit a request to a payment processor, submit a request to a payment Application Programming Interface, authorize a transaction, and send the user data to a remote terminal.

The current invention enables new functions that were not previously possible. For example, a person is in a queue, and reaches in front of a cashier. The person is ready to pay for goods. The person brings his/her authorization application to the foreground, the cashier's Point of Sale (POS) system can scan the person's phone using Bluetooth low energy, and will identify only one person with an authorization application in the foreground. The other people in the queue have their phones off or their authorization application in the background.

A normal transaction starts with a second device 10 scanning to find user devices 12 with a known/compatible authorization applications running in the foreground. Second device 10 sends a request for a service to user device 12 either through short wireless communication (Bluetooth low energy, Bluetooth 2.0), or through a database or through a socket.

Figure 3:
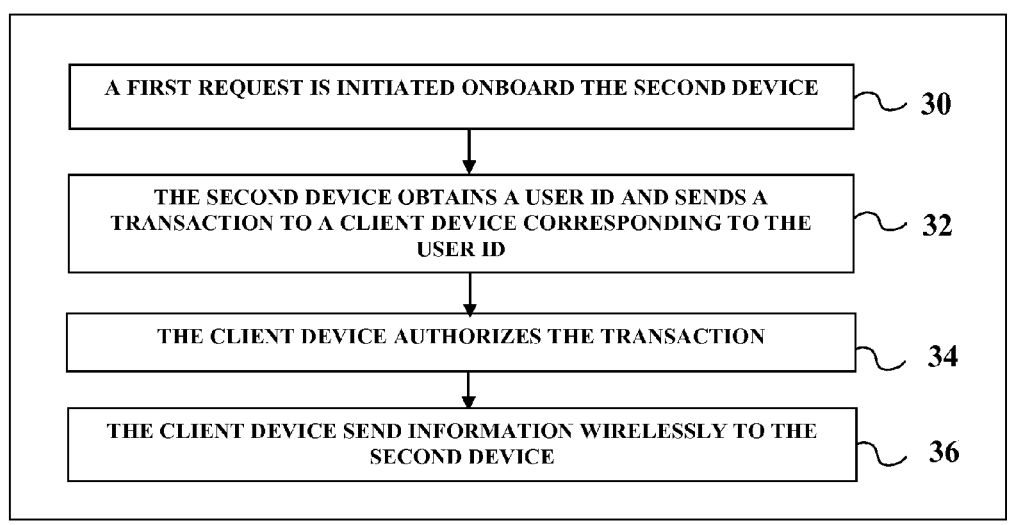
FIG. 3 is a flowchart illustrating a method for authorizing a transaction

Referring to FIG. 3, a flowchart illustrating a method for authorizing a transaction with database communication. If a user device does not have Bluetooth or Bluetooth LE, in step 30, a transaction is initiated onboard a merchant device. In step 32, the user can provide an identifier, and the merchant device can send a request to a user account on a database corresponding to the identifier. In step 34, the request is picked up by the client device and is authorized.

The authorization may involve no further action on the part of the user, may request a PIN, a voice authentication, a second person authorization or other. In a preferred embodiment, authentication changes automatically based on location and transaction value.

In step 36, the client device sends information wirelessly to the second device through the database. The user device can send the user information such as payment information, payment certificates (such as BITCOIN), password . . . . The user does not need to physically present a credit card to the merchant.

Figure 4:
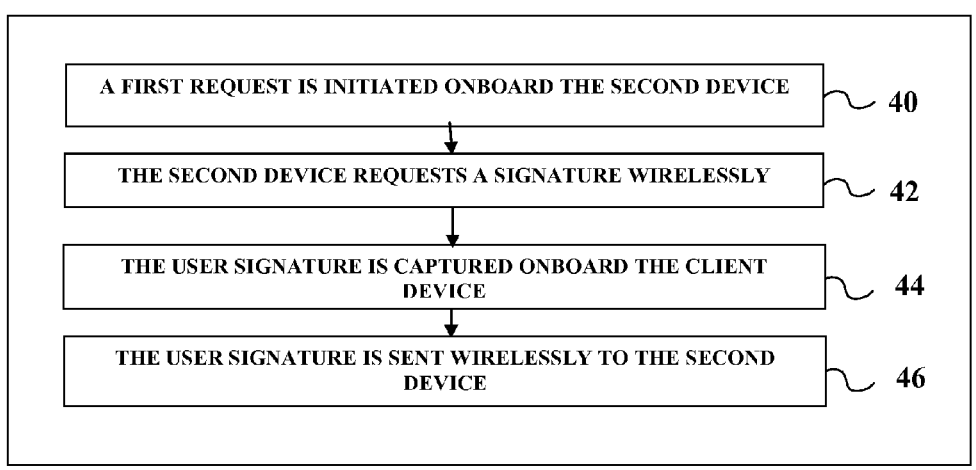
FIG. 4 is a flowchart illustrating a method for receiving a user signature

Referring to FIG. 4, a flowchart illustrating a method for receiving a user signature. In step 40, a request is initiated onboard second device 10 to request a user signature. In step 42, the second device 10 requests a signature wirelessly from a user device with an authorization application. In step 44, the authorization application captures the user signature onboard the client device. In step 46, the user signature is sent wirelessly to the second device 10.

In another embodiment, after a client device receives a request for voice authentication from the second device, the first application onboard the client device captures voice, the first application onboard the client device authenticates the captured voice, the voice authentication information is sent wirelessly to the second device.

In another embodiment, after the client device receives a request for a photo from the second device, the at least one first application onboard the client device requests approval from a user, whereby after the approval is obtained, at least one photo is sent wirelessly to the second device.

To run the authorization application, the user logs in to an account on a remote server using the authorization application onboard a user device, such as 12, 13, 14. The sign-up process requires certain information, such as information about a user account. The sign-up process may include other information such as username/password for different accounts, financial account sufficient to perform a transaction with the account. The sign up process can also require contact information for the user, e.g., mailing address and email, and possibly other personal identifying information, e.g., a photograph of the user. After creating an account, the user can select a merchant that also has an account with the cardless payment system. When a user signs up with the authorization application, the device unique ID is registered with the user's account so as to guarantee that the account it tightly linked to mobile authentication device 12, 13, 14.

The authorization application can obtain policy information from a remote server policy database. The policy information indicate conditions for authorization such as:

Trusted locations defined by areas around a GPS coordinate or a WIFI network or an area near a known RF transmitter Security rules per trusted location, un-trusted location or area with no network connectivity (no WIFI, no 3G network, no data network) including:

Authentication Type: PIN, No PIN, text challenge authentication, voice challenge authentication, timeout duration (when no user activity), and application self-defense (lock, cloak, alarm, call a phone number, send SMS/Email, wipe application data)

The remote server holds user accounts and can serve as a communication medium between second device 10 and any user device. The remote server can also hold policies that dictate authentication rules. In another preferred embodiment, the remote server is uses as a buffer for communication between second device 10 and other devices. It does not store any user login or authentication information beyond the time span of the transaction. Immediately after second device 10 retrieves the user information, the user login or authentication information is deleted from the remote server. In this embodiment, the user login, authentication information and payment information is encrypted and stored on the user authorization device.

In another embodiment, when launched, the first application publishes a new identifier, the new identifier is different from a previously broadcasted identifier, the new identifier is stored as part of the user account information on the remote server. The second application running onboard a second device obtains a stored identifier corresponding to the user account from the remote server. The stored identifier can be different from the identifier published by the client device. The second application connects to the client device corresponding to the user account using the stored identifier and short wireless communication. The second application sends at least one request wirelessly to the user device. The at least one request includes transaction information selected from the group consisting of: an invoice, a receipt, a reservation, a confirmation, a reward, a charge, transaction details, a coupon, a file, a transaction ID, an encryption key, a decryption key, and information corresponding to the remote client device identifier.

The second device or the client device can obtain policy information from the remote server.

In another embodiment, the invention comprises running a third authentication program onboard a third mobile device, a the third authentication program corresponds to the first user identifier or to the user account. The third authentication program can login to a remote server. The third authentication program stores at least one first digital key selected from the group consisting of:

a password, a random key, a one-time-password generator, a certificate, a Private Key Infrastructure (PKI) key, a symmetric key, an asymmetric key, payment information, access information, physical access code, The digital key can be stored in a secure memory location or on a secure element onboard the client device that is distinct from the second device. Upon detecting a user action onboard the client device, such as a button push, a display touch, a motion, a spoken word, and an application brought to the foreground.

If the authentication application obtains a pending authentication request wirelessly from the remote server corresponding to the user identifier, the authentication application displays the transaction information, and requests user approval such as verify a button is activated or a menu is selected or a display is touched or an application is brought to the foreground, authenticate a pass code, authenticate a response to a challenge question, and authenticate biometric information. The user authentication method can be different from a previously used user authentication method.

Upon or after a successful user authentication, the authentication application posts an authentication information update to the remote server, corresponding to a pending authentication request. The authentication information update can be a digital key.

After a period of time, if a first terminal that submitted an authentication request or a transaction for authentication retrieves an authentication information update corresponding to the authentication request, the first terminal uses the authentication information update to: unlock, uncloak, decrypt data, login to an application, authenticate to a remote server, authorize a second transaction, transmit user information wirelessly to a separate terminal, login automatically to an application interface, and call a script.

In another embodiment, the first terminal posts confirmation information corresponding to the transaction to the remote server, the authentication program retrieves the confirmation information, the authentication program displays the confirmation information.

In another preferred embodiment, the first terminal posts confirmation information corresponding to the transaction to the remote server, the authentication program retrieves the confirmation information, and the authentication program displays the confirmation information.

In another embodiment, the first terminal can periodically post verification requests to the remote server, wherein if the first terminal does not obtain an update corresponding to a verification request, the first terminal can perform an action selected from the group consisting of: lock, cloak, cancel, reject, and encrypt data.

If the first mobile device detects motion or acceleration signals that are above a pre-determined threshold, an application onboard the first terminal performs an action selected from the group consisting of: lock, cloak, close, and encrypt data. In another embodiment, the first terminal transmits user information wirelessly to a remote terminal using an RFID emulator or an RFID simulator.

In another embodiment, when a user is logged in to an application, wherein if the current location is within a pre-determined distance from a pre-defined location or if a pre-determined WIFI network is detected, the application is timed out after a first pre-determined period of inactivity;

if the current location is not within a pre-determined distance from a known location, the application is timed out after a second pre-determined period of inactivity, wherein the second pre-determined period of inactivity is different from the first pre-determined period of inactivity.

In another embodiment, object code is injected in the authentication application or in the application onboard the first terminal to provide detection/scanning, communication and security capabilities.

In another embodiment, the authentication program/application obtains sensor information from sensors located onboard the first mobile device, such as current location information, acceleration information, gyration information, tilt information, WIFI networks in view information, radio frequency networks in view information, radio frequency signal strength information, lighting level information, audio level information, and temperature information.

the authentication program can post the sensor information to the remote server. If the sensor information does not match at least one pre-determined policy, the authentication program can perform an action selected from the group consisting of: abort operation, block response, lock, exist, cloak, cancel the current transaction, and encrypt data. If the location of the first terminal is within a pre-determined distance from a pre-determined location or if the first terminal is connected to a trusted WIFI network or if the current transaction amount is below a pre-determined threshold, the user can authorize: verify a button is activated, verify a menu is selected, verify or a display is touched, and verify or an application is brought to the foreground.

If the location of the first terminal is outside pre-determined areas or if the first terminal is outside a pre-determined WIFI coverage areas or if the current transaction amount is above a pre-determined threshold, the user authentication method can be: authenticate a pass code, or authenticate a response to a challenge question. If the first terminal is not connected to any 3G or WIFI network or if the transaction matches a pre-determined condition, the user authentication method can be selected from the group consisting of: authenticate biometric information, and verify that both the first mobile device and a second mobile device authorized the transaction.

the first terminal can obtain a digital key from the authentication information update, decrypt user information using the digital key, use the decrypted user information to perform an action: login to a user account, fill a form, execute a payment transaction, unlock, and decrypt data.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:

1. A method for wirelessly identifying a client device from among a number of devices and for sending information to the client device comprising:
   at least one client device and a second device using short wireless communication;
   running at least one first application onboard the at least one client device, wherein the at least one first application can switch from the foreground to the background of the at least one client device and vice versa, and wherein when the at least one first application is in the foreground of the at least one client device, the at least one first application publishes a first state, and
   wherein when the at least one first application is in the background of the at least one device, the at least one first application publishes a second state that is different from the first state, and wherein the first state and the second state can be read wirelessly using short wireless communication;
   using the second device to send at least one short wireless message and to obtain at least one response from the at least one client device;
   using the at least one response and a second application running onboard the second device to identify at least one client device that is currently running the at least one first application in the foreground;
   whereby upon or after identifying at least one client device that is currently running the at least one first application in the foreground, sending at least one wireless request from the second device to the at least one client device, wherein the at least one wireless request includes at least one information selected from the group consisting of: an invoice, a receipt, a reservation, a confirmation, a reward, a charge, a transaction detail, a coupon, a file, a transaction ID, an encryption key, a decryption key, and an information.

2. The method of claim 1 whereby:
   display at least one part of the information onboard the at least one client device;
   after the at least one client device obtains a user action, the at least one client device provides a response to the second device, wherein the response includes user data selected from the group consisting of:
     a password, a digital key, payment information, access information, a digital payment certificate, user information, confirmation ID, signature, and a one-time password,
   wherein the user action is selected from the group consisting of:
     a button activation, a menu selection, a touch, a tap, a motion, and submitting user credentials.

3. The method of claim 2 whereby:
   after the at least one client device obtains a user action, the at least one first application publishes a second state, wherein the second state is different from the first state.

4. The method of claim 1 whereby:
   after the at least one first application runs in the foreground of the at least one client device for a pre-determined period of time,
     the at least one first application publishes a new state, wherein the new state is different from the first state.

5. The method of claim 1 whereby:
   when it runs in the foreground of the at least one client device, the at least one first application publishes at least one service, wherein the at least one service is not published when the at least one first application runs in the background of the at least one client device.

6. The method of claim 1 whereby:
   when the at least one first application runs in the background of the at least one client device,
     the at least one first application does not respond to short wireless messages;
   whereby after the at least one first application stays in the foreground of the at least one client device for a predetermined period of time,
     the at least one first application does not respond to short wireless messages.

7. The method of claim 1 whereby:
   if the second application identifies more than one client devices running the at least one first application in the foreground,
     either the second application does not send a wireless request to the identified client devices,
     or the second application displays information corresponding to the identified client devices and after a client device is selected,
       the second application sends at least one wireless request to the selected client device.

8. The method of claim 1 whereby:
   if the strength of the signal between the second application and the identified at least one client device is less than a signal threshold, or if the estimated distance between the second application and the identified at least one client device is longer than a distance threshold,
     the second application does not send a wireless request to the identified at least one client device.

9. The method of claim 1 whereby:
   the wireless request is sent through either short wireless communication or through cellular network communication.

10. The method of claim 1 whereby:
    the wireless request includes at least one code indicating a method of user authentication or user approval,
      wherein the method of user authentication or user approval is selected from the group consisting of:
        a button activation, a menu selection, a touch, a tap, a motion, a PIN, a password, a one-time password, and biometrics.

11. The method of claim 2 whereby:
    the second application uses the response to perform an action selected from the group consisting of:
      fill a form, decrypt data, encrypt data, login, submit a request to a payment processor, submit a request to a payment Application Programming Interface, authorize a transaction, and send the response to a remote terminal.

12. The method of claim 1 whereby:
    upon or after receiving a request for a hand signature from the second device,
      the at least one first application obtains a hand signature from a user, the data corresponding to the captured hand signature is sent wirelessly to the second device.

13. The method of claim 1 whereby:
after receiving a request for voice authentication from the second device,
the at least one first application captures voice from a user,
the at least one first application authenticates the captured voice,
the voice authentication information is sent wirelessly to the second device.

14. The method of claim 1 whereby:
the second device is selected from the group consisting of:
a mobile device, a point-of-sale device, a computer, an electronic system, and a TV.

15. A method for wirelessly identifying a client device from among a number of devices and sending information to the client device comprising:
using at least one client device and a second device capable of short wireless communication; running at least one first application onboard the at least one client device,
wherein the at least one first application can switch from the foreground to the background of the at least one client device and vice versa;
using the second device to send at least one short wireless message and to obtain at least one response from the at least one client device;
using the at least one response and a second application running onboard the second device to identify at least one client device that is currently running the at least one first application in the foreground;
whereby upon or after identifying at least one client device that is currently running the at least one first application in the foreground,
sending at least one wireless message from the second device to the at least one client device;
whereby a wireless message is not sent to a client device that is currently running the at least one first application in the background.

16. The method of claim 15 whereby:
when the at least one first application is in the foreground of the at least one client device,
the at least one first application publishes a first state,
and when the at least one first application is in the background of the at least one client device,
the at least one first application publishes a second state, wherein the second state is different from the first state.

17. The method of claim 15 whereby:
the wireless message comprises a request to capture a hand signature onboard the at least one client device,
whereby after the at least one client device receives a request to capture a hand signature from the second device,
the at least one first application running onboard the at least one client device captures at least one hand signature from a user,
wherein data corresponding to the captured at least one hand signature is transferred wirelessly from the at least one client device to the second device.

18. The method of claim 15 whereby:
after the at least one client device receives a request for a photo from the second device,
the at least one first application onboard the client device requests approval from a user,
whereby after a user approval is obtained,
at least one photo is sent wirelessly to the second device.

19. A method for wirelessly identifying a client device from among a number of devices and for sending information to the client device comprising:
using at least one client device and a second device capable of short wireless communication and a remote server to facilitate communication between the at least one client device and the second device;
running at least one first application onboard the at least one client device,
wherein the at least one first application publishes at least one first identifier,
and wherein the at least one first identifier can be read wirelessly using short wireless communication;
storing the at least one first identifier or an identifier corresponding to the at least one first identifier in a user account onboard the remote server;
using a second application onboard the second device to obtain at least one identifier from the remote server, wherein the at least one identifier corresponds to a user account; using the second application onboard the second device to obtain information from at least one client device corresponding to the at least one identifier,
wherein the information is obtained using short wireless communication, and wherein the second application can perform a first action when the at least one first application is running in the foreground of the at least one client device,
and wherein the second application can perform a different action or do nothing when the at least one first application is running in the background of the at least one client device.

20. The method of claim 19 whereby:
the second application sends at least one request wirelessly to the at least one client device,
wherein the at least one request includes information selected from the group consisting of:
an invoice, a receipt, a reservation, a confirmation, a reward, a charge, transaction details, a coupon, a file, a transaction ID, an encryption key, a decryption key, and information corresponding to an identifier of the at least one client device;
whereby the at least one first application can switch from the foreground to the background of the client device and vice versa;
whereby when the at least one first application is in the foreground of the client device,
the at least one first application publishes a first state,
and when the at least one first application is in the background of the client device,
the at least one first application publishes a second state,
wherein the first state and the second state can be read wirelessly using short wireless communication, and
wherein the second state is different from the first state.

* * * * *